United States Patent
Sogao et al.

(10) Patent No.: US 10,221,964 B2
(45) Date of Patent: Mar. 5, 2019

(54) VALVE DEVICE (71) Applicant: KABUSHIKI KAISHA FUJIKIN, Osaka (JP)

(72) Inventors: Masahiko Sogao, Osaka (JP); Tomohiro Mouri, Osaka (JP); Masakazu Nagao, Osaka (JP)

(73) Assignee: Kabushiki Kaisha Fujikin, Osaka (JP)

( * ) Notice: Subject to any disclaimer, the term of this patent is extended or adjusted under 35 U.S.C. 154(b) by 0 days.

(21) Appl. No.: 15/737,768

(22) PCT Filed: Aug. 4, 2016

(86) PCT No.: PCT/JP2016/073010
§ 371 (c)(1),
(2) Date: Dec. 19, 2017

(87) PCT Pub. No.: WO2017/022838
PCT Pub. Date: Feb. 9, 2017

(65) Prior Publication Data
US 2018/0156354 A1 Jun. 7, 2018

(30) Foreign Application Priority Data

Aug. 5, 2015 (JP) .................................. 2015-155407

(51) Int. Cl.
*F16K 25/00* (2006.01)
*F16K 47/02* (2006.01)
(Continued)

(52) U.S. Cl.
CPC .............. *F16K 47/023* (2013.01); *F16K 1/36* (2013.01); *F16K 1/38* (2013.01); *F16K 25/00* (2013.01); *F16K 37/0016* (2013.01)

(58) Field of Classification Search
CPC .......... F16K 47/023; F16K 25/00; F16K 1/36; F16K 37/0016; F16K 1/38
(Continued)

(56) References Cited

U.S. PATENT DOCUMENTS

| 1,584,007 A | * | 5/1926 | Brown | ....................... F16K 1/42 |
| | | | | 251/333 |
| 2,035,202 A | * | 3/1936 | Smith | ..................... B67D 3/043 |
| | | | | 251/122 |

(Continued)

FOREIGN PATENT DOCUMENTS

| JP | 05-118447 | 5/1993 |
| JP | 08-135842 | 5/1996 |

(Continued)

*Primary Examiner* — John Bastianelli
(74) *Attorney, Agent, or Firm* — McCracken & Gillen LLC (57) ABSTRACT A valve having a simple configuration that prevents the seat from being damaged by self-excited oscillation of the valve body and thus prevents seat leakage. The valve includes a valve casing having a fluid inlet, a fluid outlet, and a valve chamber; the valve chamber including a seat having a seat surface; a stem inserted into the valve casing so that the stem can be vertically movable; and a valve body arranged at a tip of the stem and capable of abutting on the seat surface of the seat due to the vertical movement of the stem such that a tip part of the valve body does not come into contact with the seat surface due to oscillation of the stem.

3 Claims, 13 Drawing Sheets (51) Int. Cl.
*F16K 1/38* (2006.01)
*F16K 37/00* (2006.01)
*F16K 1/36* (2006.01)

(58) Field of Classification Search
USPC .................................................. 251/122, 333
See application file for complete search history.

(56) References Cited

U.S. PATENT DOCUMENTS

| | | | | |
|---|---|---|---|---|
| 3,243,157 | A * | 3/1966 | Beck | F16K 47/04 251/122 |
| 5,178,366 | A * | 1/1993 | Kojima | F16K 1/36 251/359 |
| 5,443,309 | A * | 8/1995 | Beck | B60T 8/36 251/122 |
| 7,677,530 | B2 * | 3/2010 | Hasunuma | F16K 1/06 251/122 |
| 2008/0111089 | A1 * | 5/2008 | Hasunuma | F16K 1/06 251/122 |
| 2015/0007898 | A1 * | 1/2015 | Cassel | F16K 1/04 251/333 |

FOREIGN PATENT DOCUMENTS

| | | |
|---|---|---|
| JP | 2000097353 | 4/2000 |
| JP | 2008059855 | 3/2008 |
| JP | 5701360 | 4/2015 |

\* cited by examiner

VALVE DEVICE

BACKGROUND OF THE INVENTION

Field of the Invention

The present invention relates to a valve.

Description of Related Art

A variety of valves (valve apparatuses), such as globe valves, gate valves, and ball valves, are conventionally known. Structures of the valves are optimally selected according to the kind of fluid or use conditions of the valve (namely, chemical properties such as flammability and corrosiveness, and physical properties such as temperature and pressure).

A globe valve has a simple structure, a low occurrence of damage, and can be fully opened and closed even if a valve body moves less. Therefore, the globe valve can be used in industrial facilities for chemical plants and ships.

However, when a valve body of the globe valve moves closer to a seat during closing operation, a fluid passing through a gap between the valve body and the seat increases its flow rate and causes pulsation, producing self-excited oscillation to the valve and causing a problem that the valve body and the seat collide repeatedly.

Japanese Patent No. 5701360 provides a valve in a simple configuration that can prevent self-excited oscillation of a valve body, the valve comprising a valve casing continuously configured in a such direction that an upper flow path at a flow inlet and a lower flow path at a flow outlet intersect each other through a valve chamber, wherein the valve casing has a seat on an opening of the above-mentioned upper flow path on a partition wall which partitions the above-mentioned valve chamber, the seat gradually increases its diameter as it goes downstream, and a valve body provided on an annular seal part which is seatable on the above-mentioned seat, wherein the valve body is configured to be advanced to and retreated from the above-mentioned seat, and wherein the valve body is formed in a columnar body having predetermined length in the advancing and retreating direction, wherein the valve further comprises a means of reducing an exciting force which acts from the above-mentioned fluid to the above-mentioned valve body, the means is a separation promoting part which separates the fluid flowing out between the above-mentioned seat and the above-mentioned annular seal part away from the above-mentioned valve body, the above-mentioned separation promoting part is provided with a covering member that covers the entire outer peripheral part of the above-mentioned separation promoting part whose diameter is substantially constant along the axis line of the above-mentioned valve body, and the above-mentioned covering member is required to be configured to have a larger diameter than an end at the lower side of the above-mentioned annular seal part.

The valve of Japanese Patent No. 5701360 is configured to comprise the above-mentioned structure, thereby increasing a gap between a gently inclined part and the valve body and decreasing a gap between an upper part and the valve body. Accordingly, it has an advantage that when the fluid passing through the gap between the gently inclined part and the valve body flows into the gap between the upper part and the valve body, it turns into a contracted flow going radially outward and increases its flow rate, further promoting easy separation of the fluid from the valve body.

The valve of the Japanese Patent No. 5701360 has an effect of decreasing oscillation, while it cannot prevent oscillation depending on fluid conditions. Recent development of fuel cell technology etc. has required a high pressure fluid, such as high pressure hydrogen, to flow through a valve. The inventors found that when the valve described in the Japanese Patent No. 5701360 is used under the fluid conditions that the difference between a primary side pressure and a secondary side pressure of the valve is set to 50 MPa or more and that the primary side pressure exceeds 70 MPa, a stem may oscillate and a tip part of the valve body formed at a tip of the stem may come into contact with seat surface of a seat, damaging the seat and eventually causing a seat leakage.

SUMMARY OF THE INVENTION

The present invention aims to provide a valve in a simple configuration that prevents the seat from being damaged by self-excited oscillation of the valve body and thus prevents seat leakage.

First aspect of the present invention relates to a valve, the valve including a valve casing having a fluid inlet, a fluid outlet, and a valve chamber; a seat provided in the above-mentioned valve chamber and having a seat surface; a stem inserted into the above-mentioned valve casing so that the stem can be vertically movable; and a valve body arranged at a tip of the above-mentioned stem and capable of abutting on the above-mentioned seat surface of the above-mentioned seat due to the vertical movement of the above-mentioned stem; wherein a tip part of the above-mentioned valve body does not come into contact with the above-mentioned seat surface due to oscillation of the above-mentioned stem.

Second aspect of the present invention relates to the valve of the first aspect, wherein the above-mentioned valve chamber comprises a seat insertion part in which the above-mentioned seat is placed and a cylindrical part located above the seat insertion part, wherein the above-mentioned valve body comprises a truncated cone part opposed to the above-mentioned seat and an outer peripheral part having a larger diameter than that of the truncated cone part for fixing between the above-mentioned stem and the truncated cone part, wherein the radius of the bottom surface of the above-mentioned truncated cone part is larger than the maximum radius of the above-mentioned seat surface of the above-mentioned seat, wherein the radius of the tip part of the above-mentioned truncated cone part is smaller than the radius of the flow path of the above-mentioned seat, and wherein the difference between the radius of the tip part of the above-mentioned truncated cone part and the radius of the flow path of the above-mentioned seat is larger than the difference of the radius of the above-mentioned outer peripheral part and the radius of the above-mentioned cylindrical part.

Third aspect of the present invention relates to the valve of the first or second aspect, wherein the valve can be used when the difference between the primary side pressure and the secondary side pressure of the fluid is 50 MPa or more, or the primary side pressure of the fluid exceeds 70 MPa or more.

Further, fourth aspect of the present invention relates to the valve of any of first-third aspects, wherein angle of the above-mentioned seat surface is 30 to 60 degrees.

Fifth aspect of the present invention relates to a valve, the valve including a valve casing having a fluid inlet, a fluid outlet, and a valve chamber; a seat provided in the above-mentioned valve chamber and having a seat surface; a stem inserted into the above-mentioned valve casing so that the stem can be vertically movable; and a valve body arranged at a tip of the above-mentioned stem and capable of abutting on the above-mentioned seat surface of the above-mentioned seat due to the vertical movement of the above-mentioned stem; wherein the above-mentioned valve body comprises flat surface parts opposed to each other and curved surface parts opposed to each other, and the flat surface parts are arranged in parallel to the central axis of the above-mentioned fluid outlet.

According to the first aspect of the present invention, a valve can provided in a simple configuration that prevents the seat from being damaged by self-excited oscillation of the valve body and thus prevents leakage.

According to the second aspect of the present invention, the tip part of the valve body formed at the tip of the stem does not come into contact with the seat surface of the seat even if the stem causes oscillation, and thus a valve in a simple configuration can be provided that prevents the seat from being damaged by self-excited oscillation of the valve body and thus prevents seat leakage.

According to the third aspect of the present invention, the valve can be used under a fluid condition that the difference of the primary side pressure and the secondary side pressure of fluid is 50 MPa or more or a fluid condition that the primary side pressure of fluid is 70 MPa or more.

According to the fourth aspect of the present invention, the valve has an advantage that the tip part of the valve body is less likely to come into contact with the above-mentioned seat surface when oscillation occurs.

According to the fifth aspect of the present invention, occurrence of differential pressure near the stem can be reduced, preventing oscillation of the stem and thus producing a remarkable effect that the tip part of the above-mentioned valve body does not come into contact with the above-mentioned seat surface.

DETAILED DESCRIPTION OF THE INVENTION

The valve according to the embodiments of the present invention is described in detail below with reference to the accompanying drawings.

Figure 1:
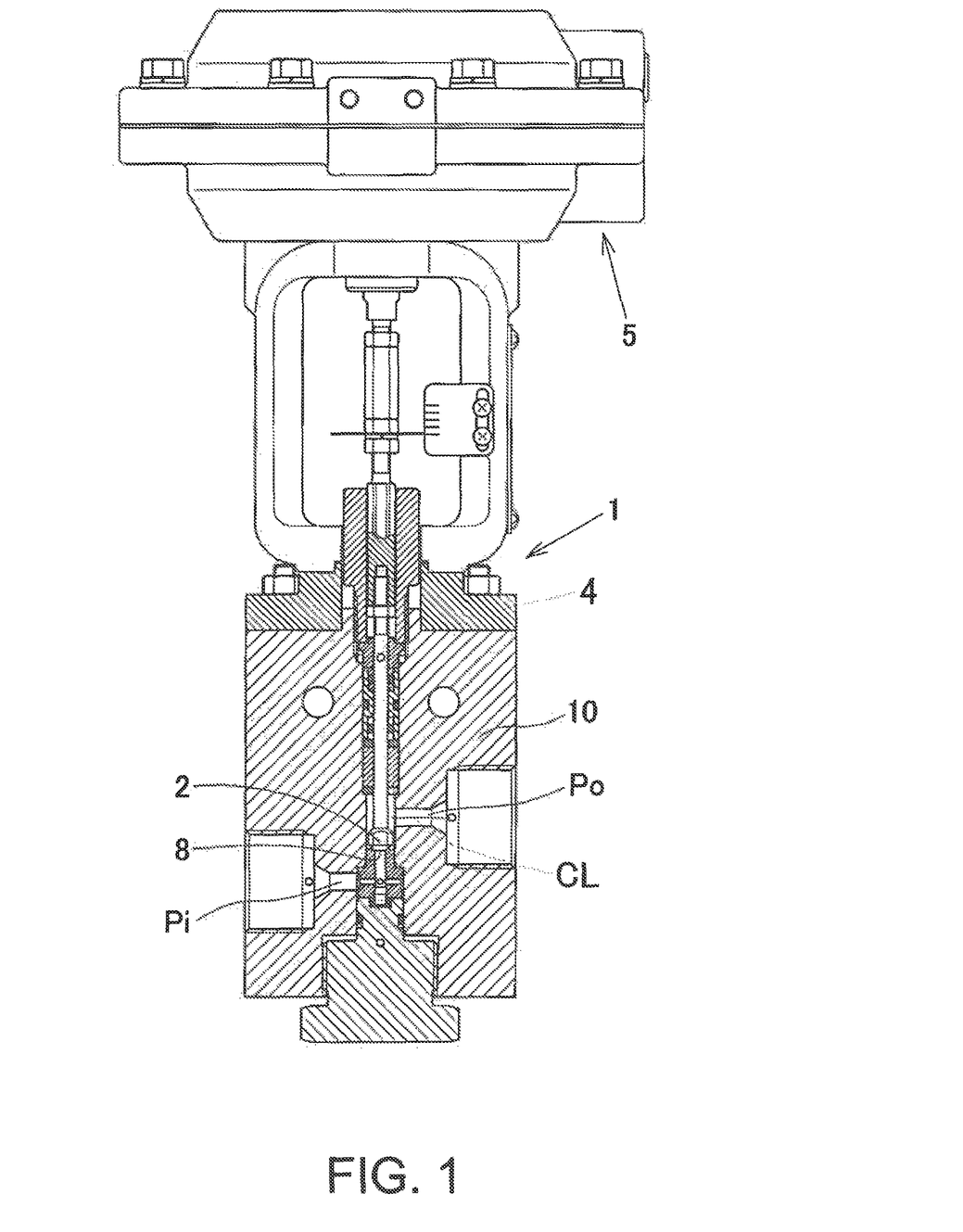
FIG. 1 is a partial cross-sectional explanatory view illustrating an example of the entire valve of the present invention.
Figure 2:
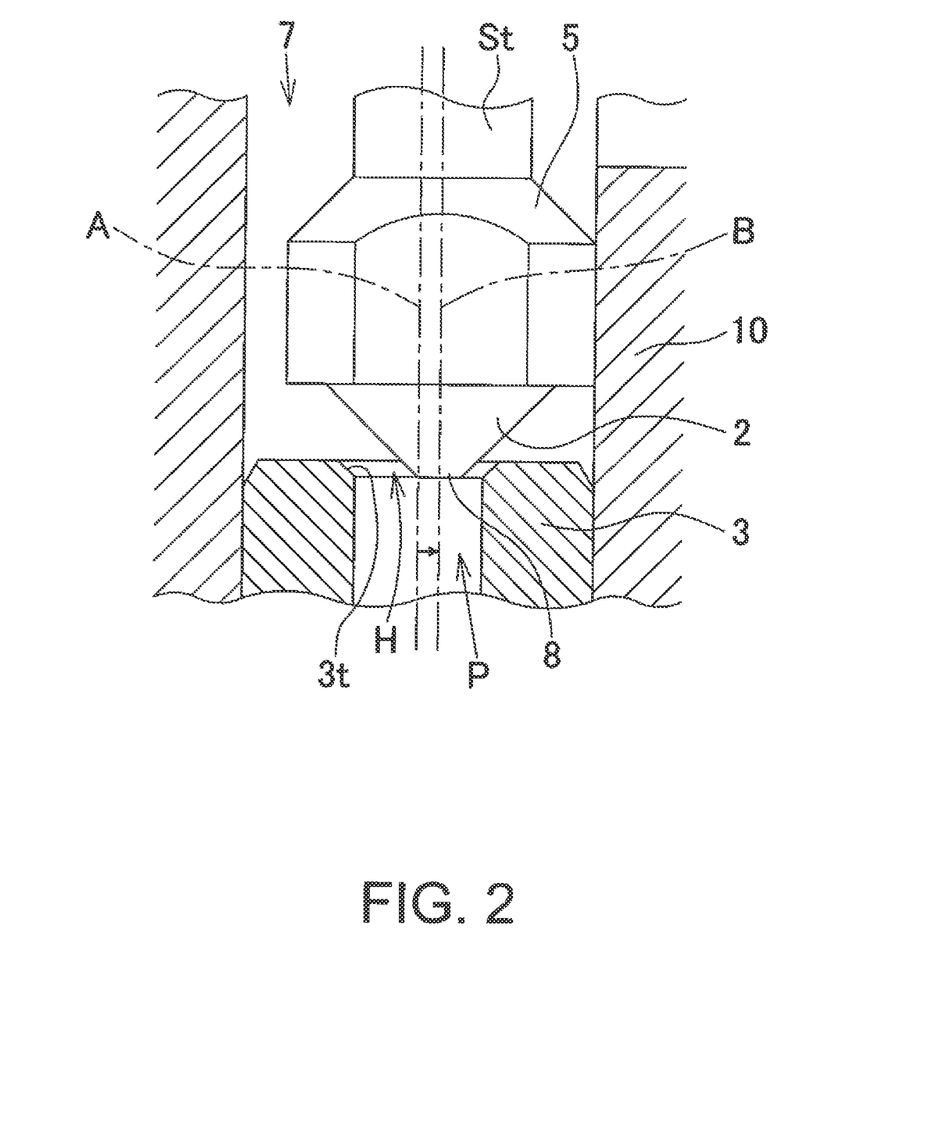
FIG. 2 is a principal cross-sectional explanatory view of the valve according to the first embodiment of the present invention.
Figure 2A:
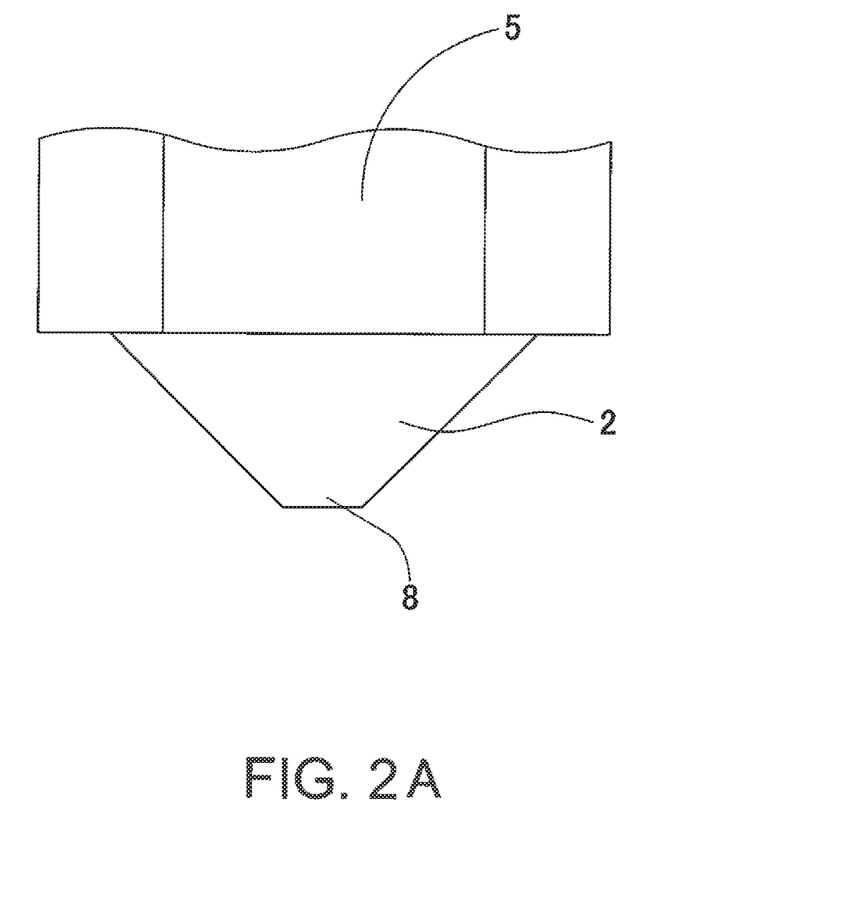
FIG. 2A is an explanatory view illustrating a valve body of FIG. 2.
Figure 2B:
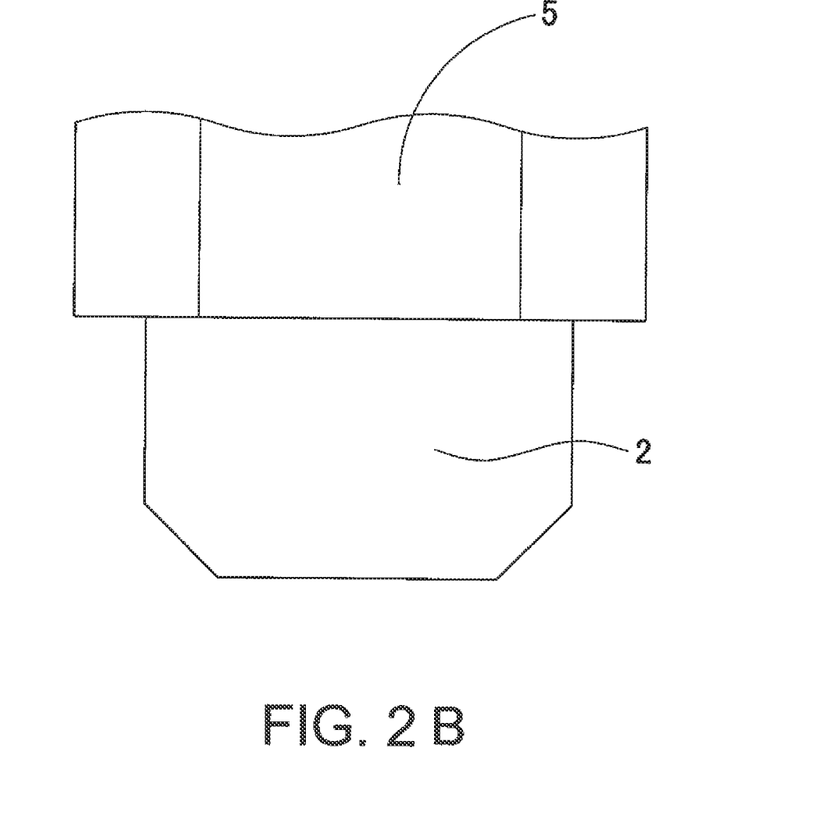
FIG. 2B is a view illustrating a modified example of the valve body of FIG. 2.
Figure 2C:
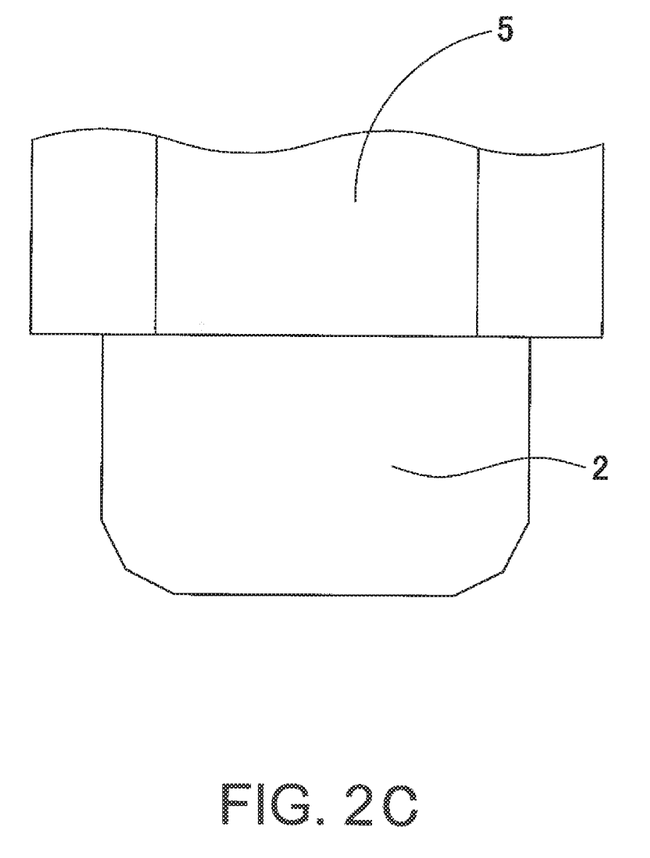
FIG. 2C is a view illustrating a modified example of the valve body of FIG. 2.
Figure 2D:
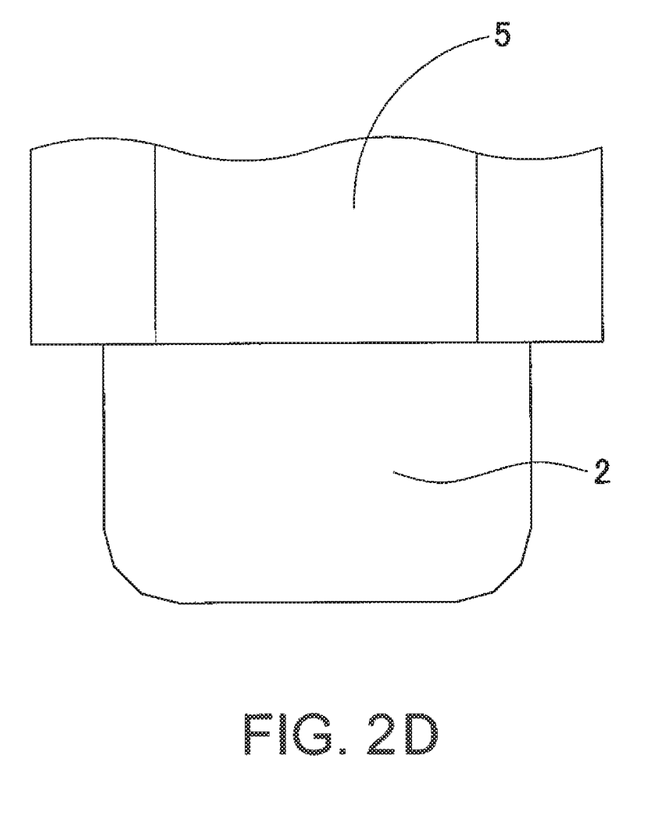
FIG. 2D is a view illustrating a modified example of the valve body of FIG. 2.
Figure 4:
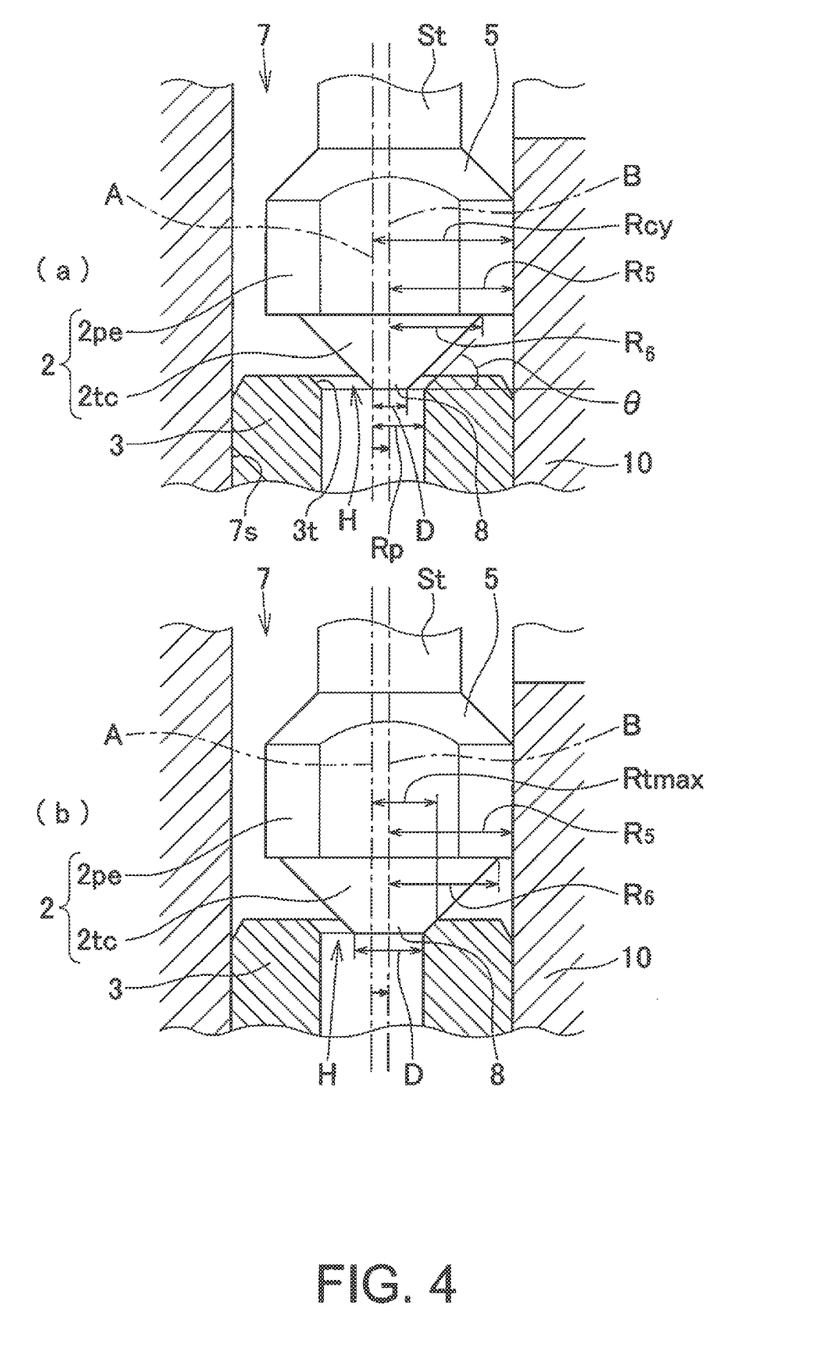
FIG. 4 is a view for explanation in comparison with the valve of the present invention and the valve according to the prior art. (a) is a principal cross-sectional explanatory view of the valve of the present invention and (b) is a principal cross-sectional explanatory view of the valve according to the prior art.
Figure 5:
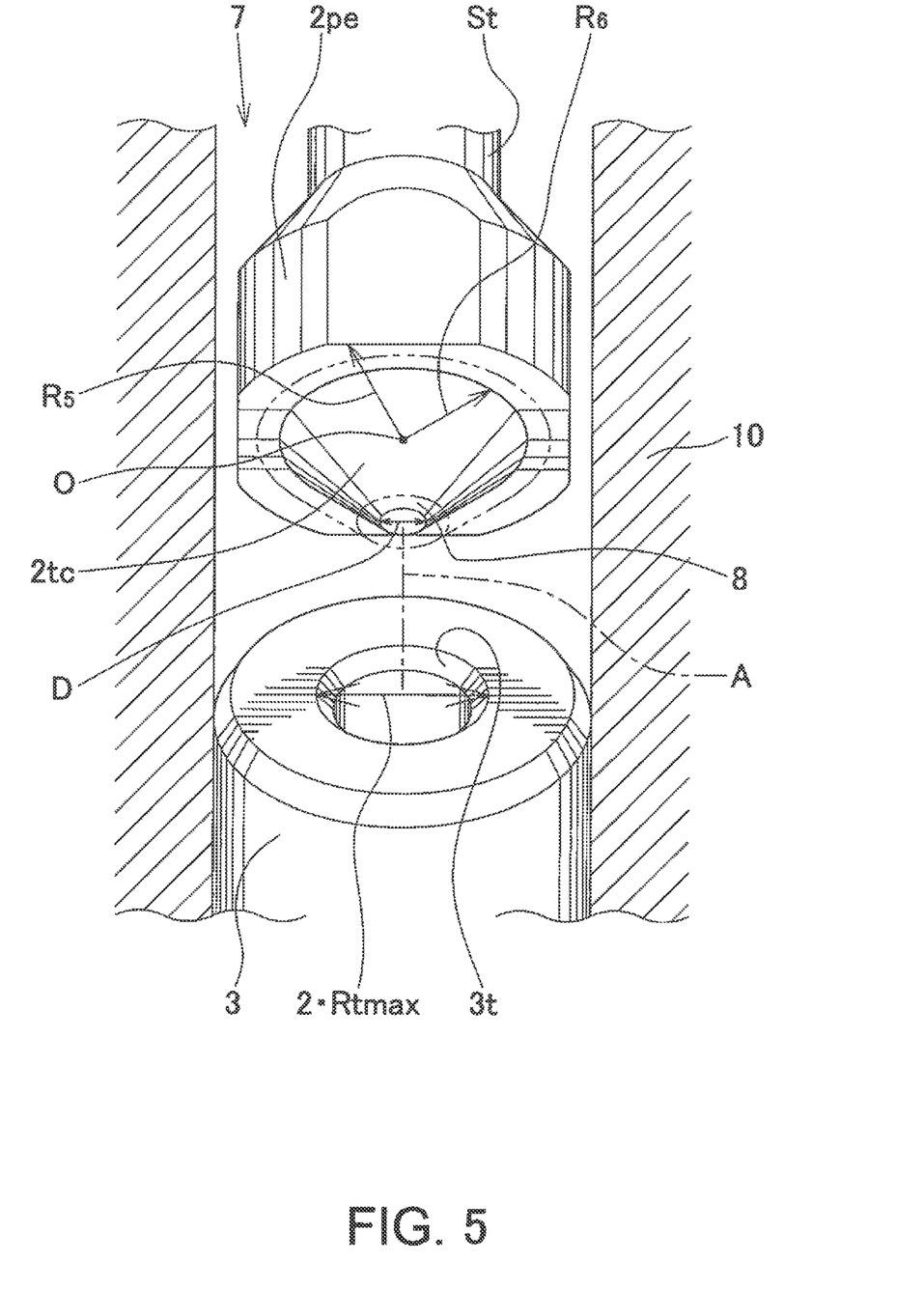
FIG. 5 is a perspective explanatory view illustrating the principal part of the valve of the present invention.
Figure 6:
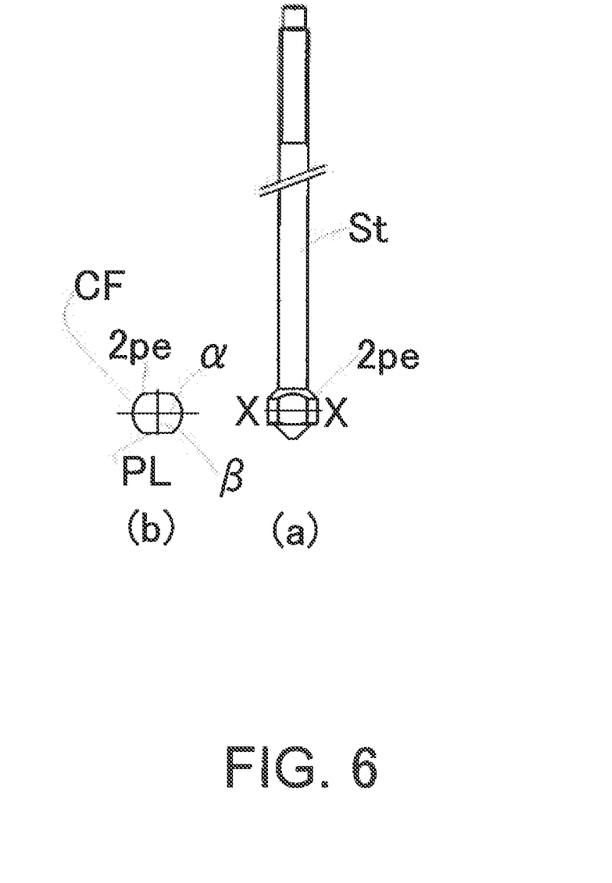
FIG. 6(a) is an explanatory view of a valve body and a stem of the valve according to the other embodiments.
FIG. 6(b) is a plan explanatory view of the valve body of FIG. 6(a).
Figure 7:
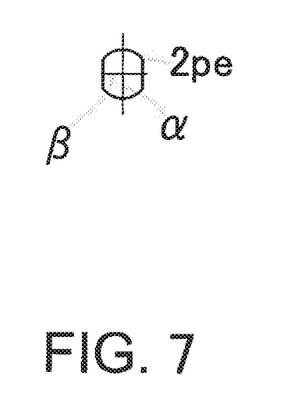
FIG. 7 is a plan explanatory view illustrating arrangement of the valve body according to the comparative example.

FIG. 1 is a partial cross-sectional explanatory view illustrating an example of the entire valve of the present invention. FIG. 2 is a principal cross-sectional explanatory view of the valve according to the first embodiment of the present invention. FIG. 2A is an explanatory view illustrating a valve body of FIG. 2. FIGS. 2B-E are views illustrating modified examples of the valve body of FIG. 2. FIG. 2F is a view illustrating a contact part of the seat of the valve body of FIG. 2. FIG. 3 is a principal cross-sectional explanatory view of the valve according to the second embodiment of the present invention. FIG. 4 is a view for explanation in comparison with the valve of the present invention and the valve according to the prior art. (a) is a principal cross-sectional explanatory view of the valve of the present invention and (b) is a principal cross-sectional explanatory view of the valve according to the prior art. FIG. 5 is a perspective explanatory view illustrating the principal part of the valve of the present invention. (a) of FIG. 6 is an explanatory view of a valve body and a stem of the valve according to the other embodiments and (b) of FIG. 6 is a plan explanatory view of the valve body of (a). FIG. 7 is a plan explanatory view illustrating arrangement of the valve body according to the comparative example.

First Embodiment

Referring to FIGS. 1, 2 and 4, the valve (1) of the first embodiment comprises a valve casing (10) having a fluid inlet (Pi), a fluid outlet (Po), and a valve chamber (7); a seat (3) provided in the above-mentioned valve chamber (7) and having an upwardly-opened flow path (P) with the seat surface (3t) (that is, an opening (H) is defined by the seat surface (3t)); a stem (St) vertically movably inserted into the valve casing (10); and a valve body (2) arranged on the tip of the above-mentioned stem (St) and capable of abutting on the seat surface (3t) of the above-mentioned seat (3) due to the vertical movement of the above-mentioned stem (St). Additionally, the angle of inclination (θ) of the seat surface (3t) (see (a) of FIG. 4) is preferably, but not necessarily, 30 to 60 degrees.

The main structural feature of the valve (1) of this first embodiment is that the tip part (8) of the above-mentioned valve body (2) does not come into contact with the above-mentioned seat surface (3t) even when oscillation occurs. The function of the valve to keep the tip part (8) of the above-mentioned valve body (2) from coming into contact with the above-mentioned seat surface (3t) is achieved with, for example, but not limited to, the following configuration of the second embodiment. In addition, referring to FIG. 2F, the "tip part" of the valve body (2) refers to an area where the valve body (2) comes into contact with the seat surface (3t) as shown with characters X, X1, X2, and X3. It does not necessarily refer to the bottom surface of the valve body (2) (see (a), (b), and (c) of FIG. 2F) and also conceptionally comprises vicinities of the bottom surface of the valve body (2) (see (d) of FIG. 2F).

Since the valve (1) of the first embodiment has a structural feature that the tip part (8) of the valve body (2) does not come into contact with the above-mentioned seat surface (3t) even when oscillation occurs, self-excited oscillation of the valve body (2) causes no damage to the seat (3) and prevents occurrence of leakage.

Second Embodiment

Referring to FIGS. 1 and 3, the valve (1) of the second embodiment is required to have the configuration of the valve (1) of the above-mentioned first embodiment. In other words, the valve (1) of the second embodiment comprises a valve casing (10) having a fluid inlet (Pi), a fluid outlet (Po), and a valve chamber (7); a seat (3) provided in the above-mentioned valve chamber (7) and having an upwardly-opened flow path (P) with the seat surface (3t) (that is, an opening (H) is defined by the seat surface (3t)); a stem (St) inserted into the valve casing (10) so that the stem can be vertically movable; and a valve body (2) arranged on the tip of the above-mentioned stem (St) and capable of abutting on the seat surface (3t) of the above-mentioned seat (3) by the vertical movement of the above-mentioned stem (St). Referring to FIG. 1, an actuator (5) of the valve (1), but not necessarily an essential component, is provided above the valve casing (10) via an upper partition wall (4).

The above-mentioned valve chamber (7) is required to comprise a seat insertion part (7se) in which the above-mentioned seat (3) is placed and a cylindrical part (7cy) above the seat insert part (7se) (see FIG. 3).

Figure 2E:
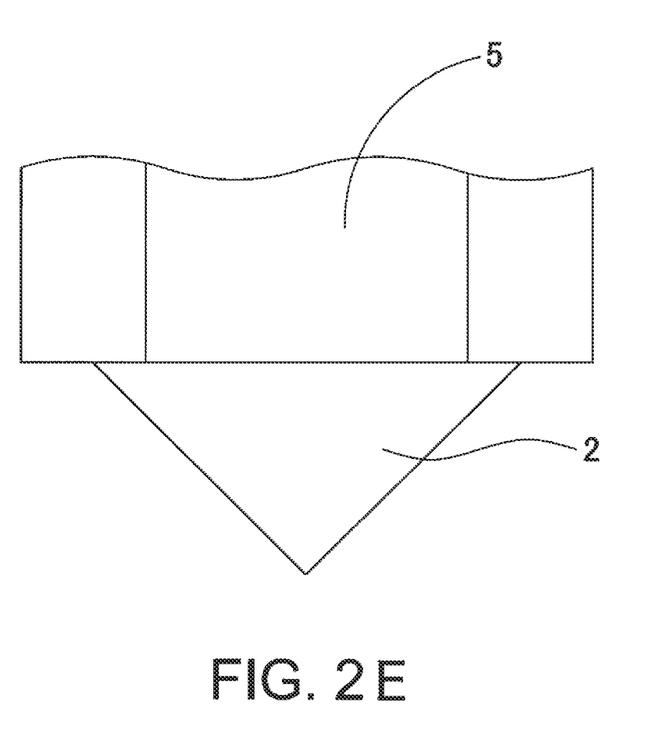
FIG. 2E is a view illustrating a modified example of the valve body of FIG. 2.
Figure 2F:
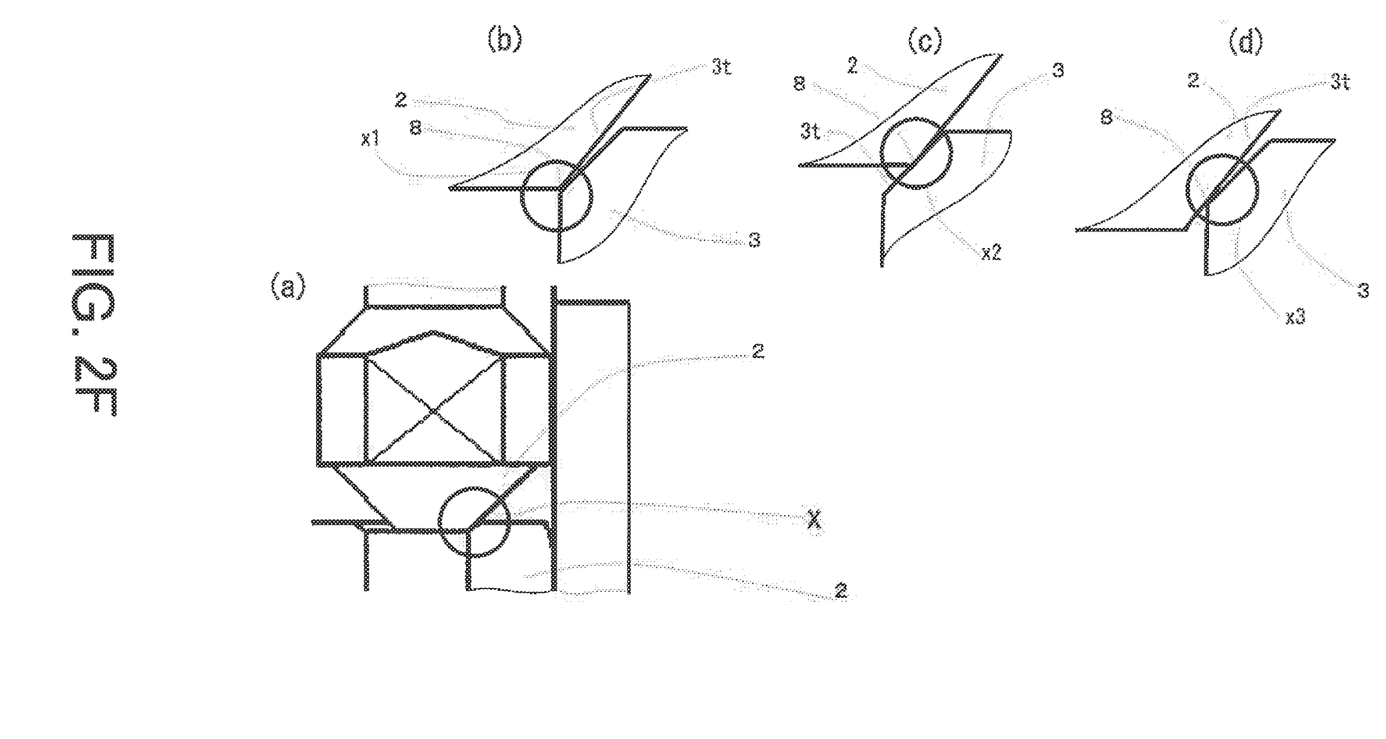
FIG. 2F is a view illustrating a contact part of the seat of the valve body of FIG. 2.
Figure 3:
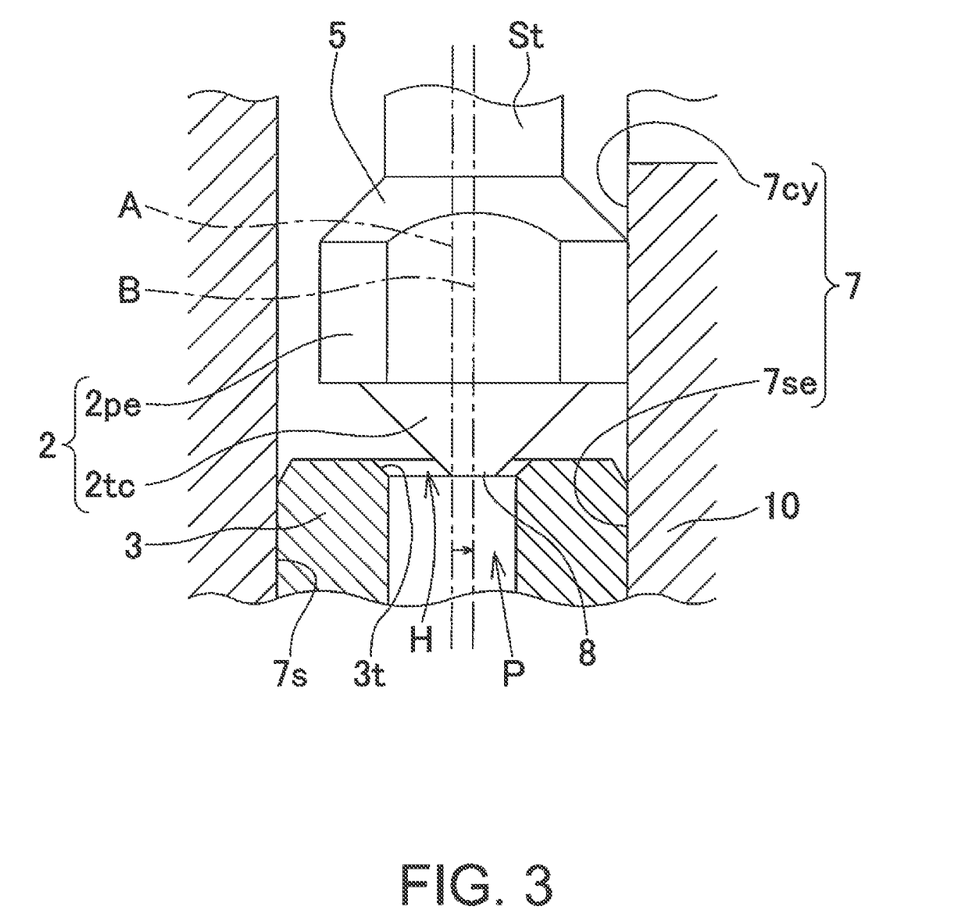
FIG. 3 is a principal cross-sectional explanatory view of the valve according to the second embodiment of the present invention.

Furthermore, valve body (2) is required to comprise a truncated cone part (2tc) or cone part opposed to the above-mentioned seat (3) (see (2) in FIG. 2E) and an outer peripheral part (2pe) having a diameter larger than the truncated cone part or cone part (2tc) for fixing between the above-mentioned stem (St) and the truncated cone part or cone part (2tc) (see FIG. 3). In addition, the "truncated cone part" in the invention conceptionally comprises the truncated cone as shown in FIG. 2A, as well as the cone part shown in FIG. 2C, a composite form of a cylinder and a truncated cone as shown in FIG. 2B, a composite form of a cylinder and two truncated cones as shown in FIG. 2C, a composite form of a cylinder and three truncated cones as shown in FIG. 2D, or a composite form selected from the group consisting of two or more of these composite forms.

Now referring to FIG. 4, the radius (R6) of the bottom surface of the above-mentioned truncated cone part (2tc) is required to be larger than the maximum radius (Rtmax) of the seat surface (3t) of the above-mentioned seat (3), the radius of the tip part (8) of the above-mentioned truncated cone part (2tc) is required to be smaller than the radius (Rp) of the flow path (P) of the above-mentioned seat (3) (see (a) in FIG. 3), and the difference between the radius ((D)/2) of the tip part (8) of the above-mentioned truncated cone part (2tc) and the radius (Rp) of the channel (P) of the above-mentioned seat (3) is required to be larger than that between the radius (R5) of the above-mentioned outer peripheral part (2pe) and the radius (Rcy) of the above-mentioned cylindrical part (7cy). In FIGS. 2 to 4, referential character A shows the axial center of the stem (St) in normal state and referential character B shows the axial center of the eccentric stem due to oscillation. That is, it is essential that the following formula (F1), (F2), and (F3) are completed.

$$R6 > Rtmax \quad \text{Formula (F1)}$$

$$(D/2) < Rp \quad \text{Formula (F2)}$$

$$|(D/2) - Rp| > |R5 - Rcy| \quad \text{Formula (F3)}$$

In addition, D≥0.

Referring to (b) in FIG. 3, the illustrated valve (1) does not satisfy the formula (F3). Namely, a formula for the valve (1) is $|(D/2)-Rp| < |R5-Rcy|$. In this case, the tip part of the valve (2) formed at the tip of the stem (St) comes into contact with the seat surface (3t) of the seat (3).

As described above, the valve (1) of the second embodiment requires the completion of the formulae (F1), (F2), and (F3), and thus the tip of the valve (2) formed at the tip of the stem (St) does not contact the seat surface (3t) of the seat (3) even if the stem (St) oscillates. For this reason, even if the stem (St) oscillates, a valve in a simple configuration that prevents the seat (3) from being damaged by generating oscillation of the stem (St) and thus prevents seat leakage can be provided.

Third Embodiment

Since the valve (1) of the third embodiment requires all configurations described in the first and second embodiments, the tip part of the valve body (2) of the valve (1) does not contact the seat surface (3t). Therefore, the valve (1) can be adopted as a valve for achieving 50 MPa or more of the difference between the primary side pressure and the secondary side pressure of fluid and a valve for achieving 70 MPa or more of the primary side pressure of fluid.

Fourth Embodiment

The valve of the fourth embodiment has the main feature of the valve (1) of the first embodiment, which is, instead of the configuration that the tip of valve body (2) does not contact seat surface (3t) even when the oscillation occurs, the valve body (2) has plane surface parts (PL) opposed to each other and curved surface parts (CF) opposed to each other, as shown in FIG. 6, and the plane surface parts (PL) opposed to each other are arranged in parallel to the center axis (CL) of the fluid outlet (Po) of the valve (1) (see FIG. 1). Except for this feature, the valve (1) of the fourth embodiment has all the configurations of the valve (1) of the first embodiment. More specifically, the valve body (2) of the valve of the embodiment has a substantially elliptic shape in a plan view. Namely, as show in FIG. 6, it has a substantially elliptic shape with a major axis (α) and a minor axis (β). The valve (1) of the embodiment has a structural feature that the valve body (2) has plane surface parts (PL) opposed to each other and curved surface parts (CF) opposed to each other and the plane surface parts (PL) opposed to each other are arranged in parallel to the center axis (CL) of the fluid outlet (Po), allowing for reduced occurrence of differential pressure near the stem and producing a remarkable effect that the oscillation of the stem (St) can be prevented.

EXAMPLES

Based on the following examples, the valve of the present invention will be further explained in detail. However, the present invention is not limited to these examples.

Example 1

(1) A software (SCRYU/Tetra) analyzed a flow of high-pressure nitrogen in a high-pressure hydrogen shutoff valve (M3R4-7100) manufactured by KABUSHIKI KAISHA FUJIKIN, in which a pipe diameter is 14.2 mm, plane surface parts opposed to each other of the valve body are arranged in parallel to the center axis of the fluid outlet, and a stem tip diameter is 2 mm. In addition, a turbulent flow type is Reynolds-averaged type, a turbulent flow model is a standard κ-ε model, a wall surface is a stationary wall, and a flow state is analyzed using steady analysis.

(2) For boundary conditions, a primary side pressure is 85 MPa, and a secondary side pressure is in an open atmosphere state (0 kPaG).

(3) For temperature conditions, an initial temperature is 20° C., and an external temperature is 20° C.

(4) For fluid property values of nitrogen, density (at 27° C.) is $1.1421 \times 10^{-9}$ kg/mm$^3$, heat conductivity (at 27° C.) is 26.2 μW/mm° C., specific heat (at 50° C.) is 1042 J/kg·K, absolute viscosity (at 27° C.) is $1.78 \times 10^{-8}$ kg/mm·sec, and gas constant is 296.8 J/kg·K.

Analysis result shows that a differential pressure of about 4 Mpa was generated near the stem, but the deviation state in flow rate at the seat part was "substantially uniform", i.e., the tip part of the valve body did not contact the seat surface.

Example 2

(1) A software (SCRYU/Tetra) analyzed a flow of high-pressure nitrogen in a high-pressure hydrogen shutoff valve (M3R4-7100) manufactured by KABUSHIKI KAISHA FUJIKIN, in which a pipe diameter is 14.2 mm, plane surface parts opposed to each other of the valve body are arranged at right angles to the central axis of the fluid outlet, and a stem tip diameter is 1 mm. In addition, a turbulent flow type is Reynolds-averaged type, a turbulent flow model is a standard κ-ε model, a wall surface is a stationary wall, and a flow state is analyzed using steady analysis.

(2) For boundary conditions, a primary side pressure is 85 MPa, and a secondary side pressure is in an open atmospheric state (0 kPaG).

(3) For temperature conditions, an initial temperature is 20° C., and an external temperature is 20° C.

(4) For fluid property values of nitrogen, density (at 27° C.) is $1.1421 \times 10^{-9}$ kg/mm$^3$, heat conductivity (at 27° C.) is 26.2 μW/mm° C., specific heat (at 50° C.) is 1042 J/kg·K, absolute viscosity (at 27° C.) is $1.78 \times 10^{-8}$ kg/mm·sec, and gas constant is 296.8 J/kg·K.

Analysis result shows that a differential pressure was slightly generated near the stem, but the deviation state of the flow rate at the seat part was "substantially uniform", i.e., the tip part of the valve body did not contact the seat surface.

Example 3

(1) A software (SCRYU/Tetra) analyzed a flow of high-pressure nitrogen in a high-pressure hydrogen shutoff valve (M3R4-7100) manufactured by KABUSHIKI KAISHA FUJIKIN, in which a pipe diameter is 14.2 mm, plane surface parts opposed to each other of the valve body are arranged parallel to the central axis of the fluid outlet, and a stem tip diameter is 1 mm. In addition, a turbulent flow type is Reynolds-averaged type, a turbulent flow model is a standard κ-ε model, a wall surface is a stationary wall, and a flow state is analyzed using steady analysis.

(2) For boundary conditions, a primary side pressure is 85 MPa, and a secondary side pressure is in an open atmospheric state (0 kPaG).

(3) For temperature conditions, an initial temperature is 20° C., and an external temperature is 20° C.

(4) For fluid property values of nitrogen, density (at 27° C.) is $1.1421 \times 10^{-9}$ kg/mm$^3$, heat conductivity (at 27° C.) is 26.2 μW/mm° C., specific heat (at 50° C.) is 1042 J/kg·K, absolute viscosity (at 27° C.) is $1.78 \times 10^{-8}$ kg/mm·sec, and gas constant is 296.8 J/kg·K.

Analysis result shows that a differential pressure was slightly generated near the stem, but the deviation state of the flow rate at the seat part was "substantially uniform", i.e., the tip part of the valve body did not contact the seat surface.

Comparative Example (1) A software (SCRYU/Tetra) analyzed a flow of high-pressure nitrogen in a high-pressure hydrogen shutoff valve (M3R4-7100) manufactured by KABUSHIKI KAISHA FUJIKIN, in which a pipe diameter is 14.2 mm, plane surface parts opposed to each other of the valve body are arranged perpendicular to the central axis of the fluid outlet (i.e., a valve, wherein a valve body (2) comprises plane surface parts (PL) opposed to each other and curved surface parts (CF) opposed to each other, and wherein the plane surface parts (PL) opposed to each other are arranged perpendicular to the central axis (CL) of the fluid outlet (Po), with reference to FIG. 7), and a stem tip diameter is 2 mm. In addition, a turbulent flow type is Reynolds-averaged type, a turbulent flow model is a standard κ-ε model, a wall surface is a stationary wall, and a flow state is analyzed using steady analysis.

(2) For boundary conditions, a primary side pressure is 85 MPa, and a secondary side pressure is in an open atmospheric state (0 kPaG).

(3) For temperature conditions, an initial temperature is 20° C., and an external temperature is 20° C.

(4) For fluid property values of nitrogen, density (at 27° C.) is $1.1421 \times 10^{-9}$ kg/mm$^3$, heat conductivity (at 27° C.) is 26.2 μW/mm° C., specific heat (at 50° C.) is 1042 J/kg·K, absolute viscosity (at 27° C.) is $1.78 \times 10^{-8}$ kg/mm·sec, and gas constant is 296.8 J/kg·K.

Analysis result shows that a differential pressure of about 4 MPa was generated near the stem, but the deviation state of the flow rate at the seat part was "considered to be strong at the outlet flow pass", i.e., the tip part of the valve body contacted the seat surface.

The examples 1 to 3 and the comparative example showed that the valve, which has a structural feature that the valve body (2) comprises the plane surface parts (PL) opposed to each other and the curved surface parts (CF) opposed to each other, wherein the plane surface parts (PL) opposed to each other are arranged in parallel to the central axis (CL) of fluid outlet (Po), can reduce occurrence of differential pressure near the stem (St), producing a remarkable effect that the oscillation of the stem can be prevented and the tip part of the valve body (2) does not contact the seat surface (3t) even if the differential pressure is generated near the stem (st).

The present invention can provide the valve in a simple configuration that prevents the seat from being damaged by self-excited oscillation of the valve body and thus prevents seat leakage.

The invention claimed is:
1. A valve, comprising:
a valve casing having a fluid inlet, a fluid outlet, and a valve chamber;
a seat provided in said valve chamber and having a seat surface;
a stem inserted into said valve casing so that the stem can be vertically movable; and a valve body arranged at a tip of said stem and capable of abutting on said seat surface of said seat due to the vertical movement of said stem;

wherein a tip part of said valve body does not come into contact with said seat surface due to oscillation of said stem, wherein said valve chamber comprises a seat insertion part in which said seat is placed and a cylindrical part located above the seat insertion part, wherein said valve body comprises a truncated cone part opposed to said seat and an outer peripheral part having a larger diameter than that of the truncated cone part for fixing between said stem and the truncated cone part, wherein the radius of the bottom surface of said truncated cone part is larger than the maximum radius of said seat surface of said seat, wherein the radius of the tip part of said truncated cone part is smaller than the radius of the flow path of said seat, and wherein the difference between the radius of the tip part of said truncated cone part and the radius of the flow path of said seat is larger than the difference of the radius of said outer peripheral part and the radius of said cylindrical part.

2. The valve according to claim 1, wherein the valve can be used when the difference between the primary side pressure and the secondary side pressure of the fluid is 50 MPa or more, or the primary side pressure of the fluid exceeds 70 MPa or more.

3. The valve according to claim 1, wherein an angle of said seat surface is 30 to 60 degrees.

* * * * *